Jan. 4, 1966     S. F. JUDD     3,227,021
SCRAP METAL SHEARS WITH ATTACHED PIVOTED CLAMP
Filed Oct. 2, 1962     2 Sheets-Sheet 1
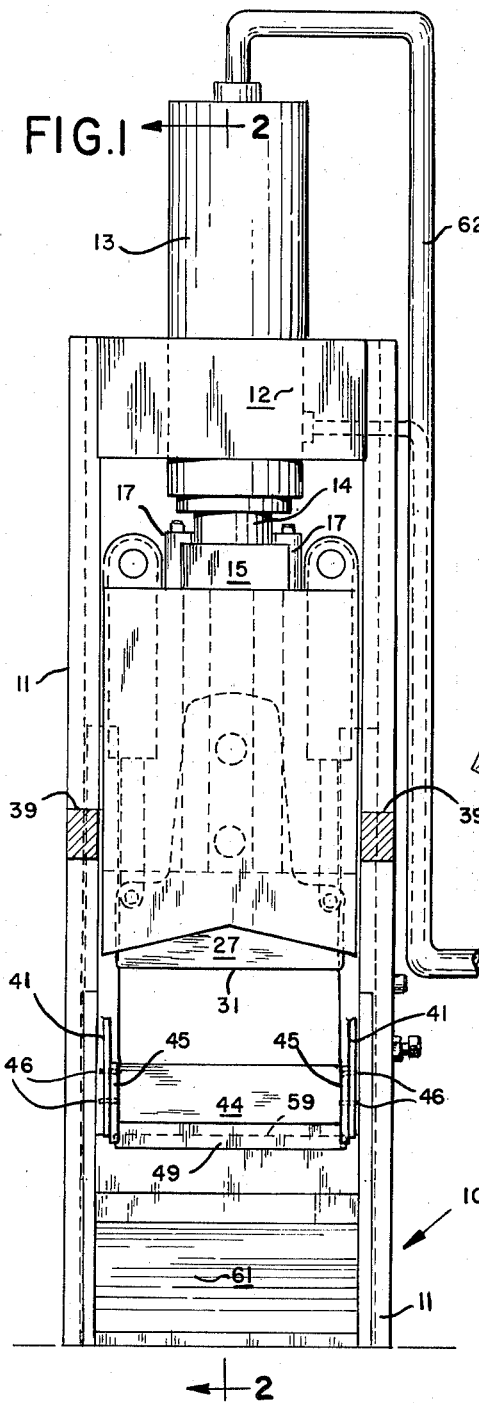
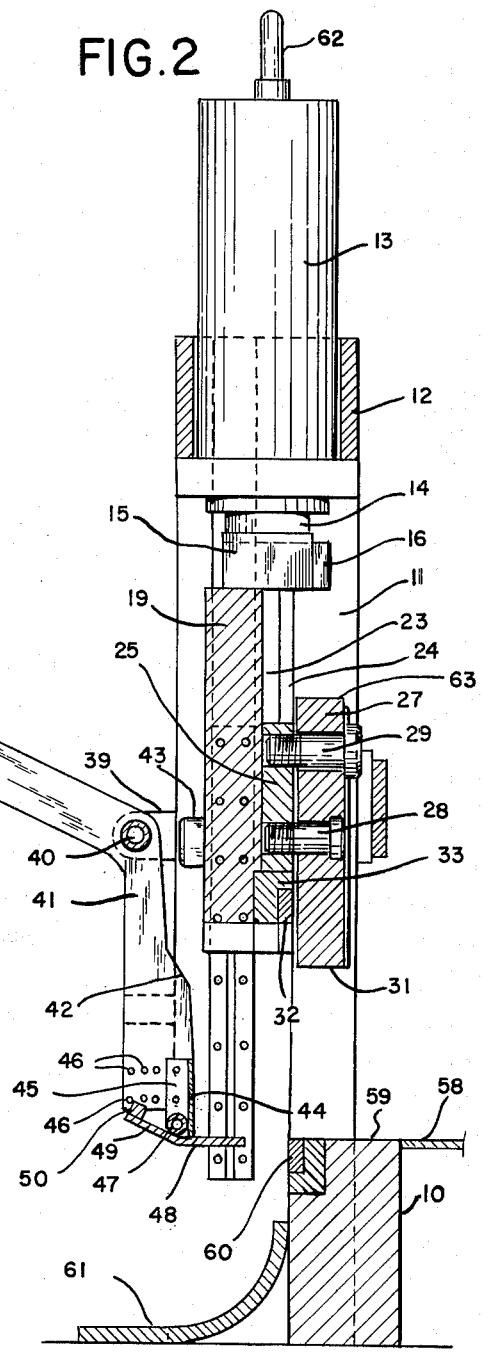
INVENTOR.
Sebastian F. Judd
BY
Morsell & Morsell
ATTORNEYS Jan. 4, 1966  S. F. JUDD  3,227,021
SCRAP METAL SHEARS WITH ATTACHED PIVOTED CLAMP
Filed Oct. 2, 1962  2 Sheets-Sheet 2
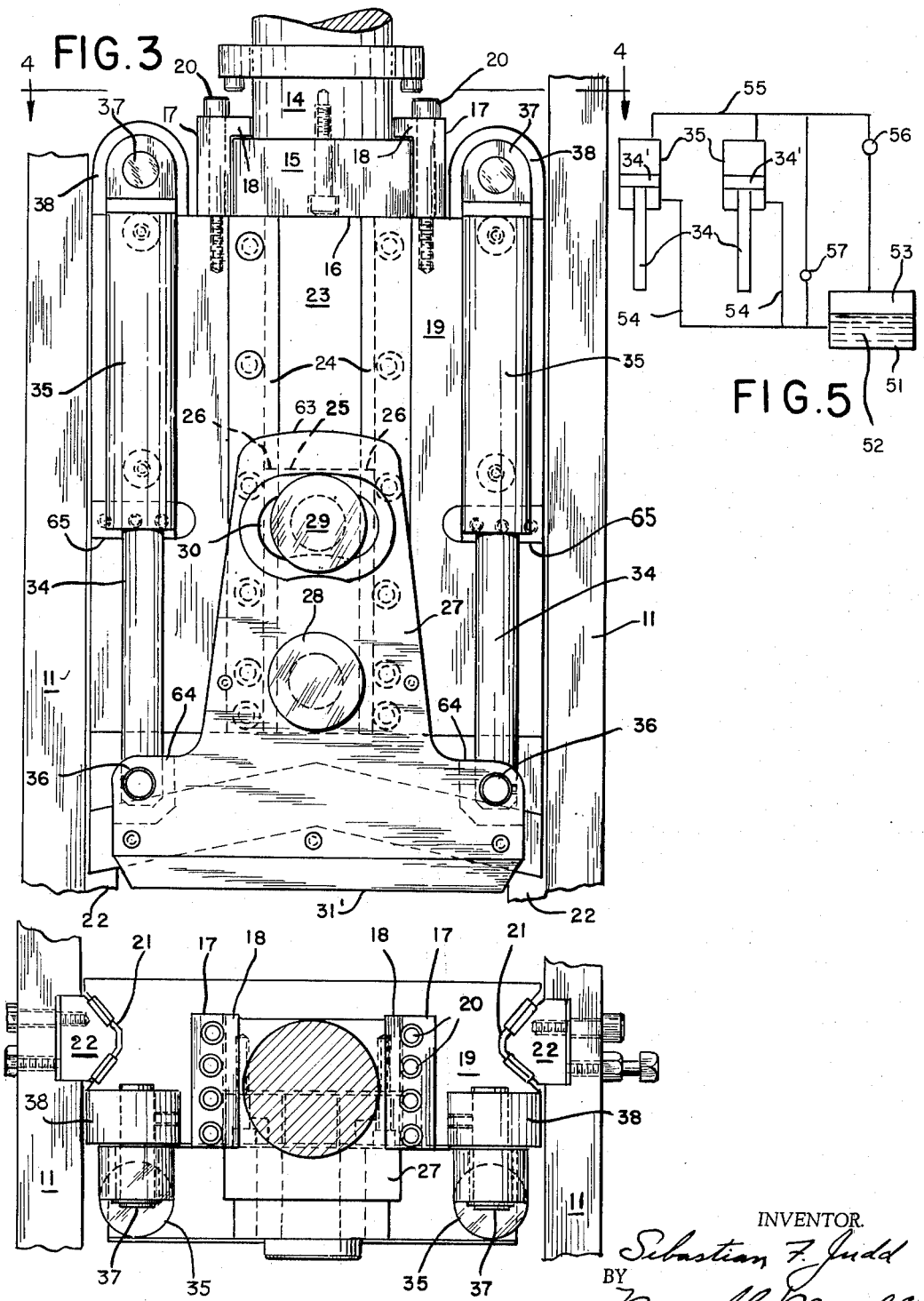

United States Patent Office 3,227,021
Patented Jan. 4, 1966

3,227,021
SCRAP METAL SHEARS WITH ATTACHED
PIVOTED CLAMP
Sebastian F. Judd, Milwaukee, Wis., assignor to Steel Briquette Corp., Wauwatosa, Wis., a corporation of Wisconsin
Filed Oct. 2, 1962, Ser. No. 227,770
5 Claims. (Cl. 83—386)

This invention relates to improvements in scrap metal shears.

In the use of scrap metal shears it is necessary to have suitable means for holding the material while it is being sheared. Heretofore, this has necessitated a separate hold-down member with a separate fluid-pressure-operated hold-down cylinder for lowering and raising the hold-down member. Thus, in prior shears it has been necessary to have two fluid pressure-operated cylinders—one for the hold-down member, and one for the shear—which was an expensive and complicated arrangement.

In addition to the above, problems have been encountered with the use of prior shears in preventing pieces of material which are only slightly larger than shearing size from falling through to discharge without being sheared.

A general object of the present invention is to provide an improved scrap metal shear wherein the shear head has a self-contained hold-down member which is movably mounted on the shear head in a novel manner whereby the shear head and hold-down member are moved into and out of operative position by the same fluid-pressure-operated cylinder, with a resulting saving in time and expense.

A further object of the invention is to provide a scrap metal shear having novel shelf means for preventing material which is in shearing position from falling through to discharge prior to being clamped by the hold-down member.

A more specific object of the invention is to provide a scrap metal shear as above described wherein there is means for automatically moving said shelf to an out-of-the-way position immediately following clamping of the work by the hold-down.

A further more specific object of the invention is to provide a scrap metal shear as above described wherein said shelf can pivot independently to adapt itself to the shape of badly shaped pieces of work and thereby prevent the shelf from being bent during shearing.

A further object of the invention is to provide a scrap metal shear having a self-contained hold-down member with holding pistons, and having means for preventing said pistons from hitting the tops of their cylinders, with resulting damage, when there are unusually large pieces of work.

With the above and other objects in view, the invention consists of the improved scrap metal shear, and all of its parts and combinations, as set forth in the claims, and all equivalents thereof.

In the accompanying drawing, illustrating one complete embodiment of the preferred form of the invention, in which the same reference numerals designate the same parts in all of the views:

FIG. 1 is a front elevational view of an improved shear, parts of the shelf levers being broken away;

FIG. 2 is a vertical sectional view taken on the line 2—2 of FIG. 1, the holding cylinders being omitted for clarity;

FIG. 3 is a fragmentary rear elevational view looking at the shear head and holding cylinders;

FIG. 4 is a fragmentary sectional view taken on the line 4—4 of FIG. 3; and

FIG. 5 is a diagrammatic view showing the hydraulic system.

Referring more particularly to the drawing, the numeral 10 designates an upright frame having spaced side members 11. Spanning the upper ends of the side members is a tranverse yoke 12 suitably supporting a fluid pressure cylinder 13, preferably hydraulically actuated.

The cylinder has an extensible ram 14 with a lower head 15 having a rear stop projection 16 (see FIG. 2). Brackets 17 having clamping flanges 18 are bolted to the shear head 19 by bolts 20. This provides a floating connection between the head 15 of the piston and the shear head 19. The shear head is mounted for reciprocating movement between the spaced side members 11 of the frame. In the preferred embodiment, the shear head 19 has side grooves 21, preferably of V-shape in cross section, for coaction with V-ribs 22 on the side members 11, as illustrated in FIG. 4.

The rear face of the shear head 19 has a vertical slot 23, there being side flanges 24 projecting inwardly beyond the sides of the slot (as shown in FIGS. 2 and 3) whereby the slot is T-shaped in cross section so that the slot 23 may be referred to as a T-slot. Slidable in the slot 23 is a slide 25 which is provided with side projections 26, which project behind the flanges 24. The slide 25 is, therefore, T-shaped in cross section to fit the slot 23.

Referring more particularly to FIG. 3, a hold-down member 27 is pivotally connected to the slide 25 by a pin 28, as shown in FIGS. 2 and 3. Another pin 29 extends through an arcuate slot 30 in the upper portion of the hold-down member (see FIG. 3) whereby the hold-down member has limited pivotal movement around the pin 28. The purpose of this is to allow the hold-down member to rock to conform to unevenness of material being held, as will be hereinafter described in greater detail.

The bottom 31 of the hold-down member normally projects below the bottom of the shear knife 32, as is shown in FIGS. 2 and 3. The shear knife is mounted in a holding block 33 carried by the lower portion of the shear head 19. The hold-down member 27 is normally held in the position shown in FIGS. 2 and 3 by the rams 34 of holding cylinders 35, the lower ends of the rams being pivoted to the hold-down member as at 36. The upper ends of the cylinders 35 are pivotally mounted on horizontal pins 37 which project from brackets 38 on top of the shear head 19.

Intermediately pivoted to brackets 39 as at 40, which brackets project rearwardly from the side frame members 11, are spaced levers 41 (see FIG. 2). These levers have inwardly projecting cam surfaces 42 for coaction with cam members 43 on the shear head, whereby when the shear head 19 is lowered, the cam members 43 cause the lower portions of the levers 41 to be swung outwardly. A transverse stop bar 44 has flanged ends 45 which are adjustably connectible to a selected set of bolt holes 46 on the lower ends of the levers 41 as shown in FIG. 2. Pivoted to the lower portion of the back side of the stop bar, as at 47, is a shelf 48. The shelf has an upwardly projecting rear portion 49 which is counterweighted, as at 50, to normally urge the shelf to the horizontal position shown in FIG. 2 in abutment against the lower edge of the stop bar 44.

Referring now to FIG. 5, this illustrates one type of hydraulic system for the hold-down cylinders. There is a reservoir 51 having oil 52 in the lower portion thereof, the upper portion 53 of the reservoir being kept under air pressure from a suitable source. The reservoir is connected to the lower portions of the cylinders by hydraulic lines 54, oil from above the piston 34′ being exhausted through the line 55. When the hold-down member meets resistance, such as is encountered when holding down material, hydraulic fluid above the pistons 34' will be forced back through the line 55, past a relief valve 56, back into the reservoir 51. The relief valve is set to allow exhaust above a predetermined pressure. This provides a relief for the hold-down member. The upper portions of the cylinders 35 are kept recharged as a result of the air pressure in the upper portion 53 of the reservoir which forces the oil past a non-return check valve 57 into the upper ends of the cylinders.

*Operation*

In operation, scrap metal which is suitably fed in on a chute 58 will have its end hit the stop plate 44. Its inner end will rest on the shelf 48, and the major portion will be supported on the ledge 59. If it were not for the shelf 48 pieces of material which might be only somewhat longer than the distance between the stop plate 44 and the stationary shear knife 60 might fall into the discharge opening 61 before being sheared. This would result in pieces greater than the desired size going through to discharge.

Hydraulic fluid from a suitable source is allowed to flow into the upper end of the shear head cylinder 13 through inlet conduit 62 to move the shear head 19 downwardly. Inasmuch as the bottom 31 of the hold-down member leads, this will contact work on the ledge 59 to clamp it against said ledge. Thereafter, the hold-down member cannot move any farther downwardly. The shear head 19, however, will continue moving downwardly until the shear knife 32, coacting with the stationary shear knife 60, cuts off the piece of material. This movement of the shear head, after the hold-down member has stopped, is permitted because the slide 25 attached to the hold-down member slides in the T-slot 23 to allow the necessary relative movement. However, such continued movement of the shear head is against the predetermined pressure in the upper portions of the holding cylinders 35 as set by the relief valve 56, and this pressure is set to exert a predetermined hold-down force on the work.

In the case of a bulky piece of scrap material, and to prevent the pistons 34' from smashing against the tops of the cylinders 35, there is a safety arrangement, i.e., the top portion 63 for the hold-down member will hit the projection 16, as is clear from FIG. 2, before the pistons 34' can hit the tops of the cylinders. In addition to this, there are shoulders 64 (see FIG. 3) on the hold-down member which will engage stops 65 on the shear head. If the hold-down member should be tilted on its pivot 28, these stops 64 will engage before the upper end 63 of the hold-down engages the projection 16. In any event, the projections 64 will engage the stops 65 before the pistons 34' can bottom. If the projections 64 engage the stops 65 before the stop 64 of the hold-down member engages the projection 16, as will occur when there is a predetermined amount of tilting of the hold-down member, this action will tend to straighten out the hold-down member, with the result that the safety stop will ultimately be accomplished by the top 63 of the hold-down member engaging the projection 16.

Immediately after the hold-down member clamps the piece of material to be sheared on the ledge 59, the cams 43 act on the cam surfaces 42 to tilt the shelf 48 rearwardly out of the way and permit discharge of the sheared piece. In case there is a very badly shaped piece of material being sheared, so that it rests unevenly on the shelf 48, the shelf can pivot independently about the pivot 47 to prevent the shelf from being bent during the actual shearing.

It is apparent from the above that a very simple form of self-contained hold-down has been employed which permits the main part of the movement of the hold-down member and shear head to take place simultaneously under the influence of the same hydraulic cylinder. This results in a saving of time and expense over systems where the hold-down member had to be first moved into clamping position under the influence of a separate actuator before the shear was moved by another separate actuator. It is also apparent that the relative movement between the hold-down member and shear head is arranged in a novel manner, and that the shear head is mounted for a limited amount of tilting movement to accommodate itself to the work. In addition, the automatic pivoted shelf provides proper support for relatively short pieces of work to prevent such pieces falling prematurely before being sheared.

Various changes and modifications may be made without departing from the spirit of the invention, and all of such changes or modifications are contemplated as may come within the scope of the claims.

What I claim is:

1. In a shear having a frame with a stationary knife and having a shear head movably supported in said frame and carrying a shear head knife for coaction with said stationary knife, said shear head having a guideway, a slide movable in said guideway, a hold-down member pivotally connected to said slide and having a leading portion positioned to engage the work to hold it in position over the stationary knife before the shear head knife arrives at shearing position, the guideway being so disposed that the movement of the slide in the guideway is in a direction to provide for relative movement between the shear head and hold-down member while the shear head continues its movement to shear the work, said pivotal connection between the hold-down member and slide providing for tilting of the hold-down member to adapt itself to the contour of the work.

2. In a shear having a frame with a stationary knife and having a shear head movably supported in said frame and carrying a shear head knife for coaction with said stationary knife said shear head having a slot, a slide movable in said slot, a hold-down member carried by said slide and having a leading portion positioned to engage the work to hold it in position over the stationary knife before the shear head knife arrives at shearing position, the slot being so disposed that the movement of the slide in the slot is in a direction to provide for relative movement between the shear head and hold-down member while the shear head continues its movement to shear the work, and means including at least one fluid pressure cylinder and piston rod connnected between the shear head and hold-down member for causing the latter to exert a predetermined pressure on the work during said last movement of the shear head, there being a piston in said cylinder on said piston rod, and there being stop means positioned to be engaged by a portion of the hold-down member for preventing bottoming of the pistons in the cylinders.

3. In a shear having a frame with a stationary knife and having a shear head moveably supported in said frame and carrying a shear head knife for coaction with said stationary knife, said shear head having a slot, a slide movable in said slot, a hold-down member supported on said slide and having a leading portion positioned to engage the work to hold it in position over the stationary knife before the shear head knife arrives at shearing position, the slot being so disposed that the movement of the slide in the slot is in a direction to provide for relative movement between the shear head and hold-down member while the shear head continues its movement to shear the work, and means including at least one fluid pressure cylinder and piston rod connected between the shear head and hold-down member for causing the latter to exert a predetermined pressure on the work during said last movement of the shear head, there being a piston in said cyinder on said piston rod, and there being means between the hold-down member and shear head for preventing bottoming of the pistons in the cylinders.

4. In a shear having a frame with a stationary knife and having a shear head movably supported in said frame and carrying a shear head knife for coaction with said stationary knife, said shear head having a slot, a slide movable in said slot, a hold-down member pivotally supported on said slide and having a leading portion positioned to engage the work to hold it in position over the stationary knife before the shear head knife arrives at shearing position, the slide being so disposed that the movement of the slide in the slot is in a direction to provide for relative movement between the shear head and hold-down member while the shear head continues its movement to shear the work, and means including at least one fluid pressure cylinder and piston rod connected between the shear head and hold-down member for causing the latter to exert a predetermined pressure on the work during said last movement of the shear head, there being a piston in said cylinder on said piston rod, said pivoted support for the hold-down member providing for tilting movement whereby it may adapt itself to the shape of the work, and there being means between the hold-down member and shear head for preventing bottoming of the pistons in the cylinders when tilting of the hold-down member occurs.

5. In a shear having a frame with a stationary knife, and having a shear head movably supported in said frame and carrying a shear head knife for coaction with said stationary knife, a slide, means on said shear head supporting said slide for slidable movement toward and away from said stationary knife, a hold-down member pivoted intermediate its length to said slide and having a leading portion positioned to engage the work to hold it in position over the stationary knife before the shear head arrives at shearing position, said slide movement providing for relative movement between the shear head and hold-down member while the shear head continues its movement to shear the work, and means including a fluid pressure cylinder and piston rod on each side of the pivotal connection for the hold-down member connected between the shear head and hold-down member for causing the latter to exert a predetermined pressure on the work during said last movement of the shear head, said pivotal connection between the hold-down member and slide providing for tilting movement of the hold-down member whereby it may adapt itself to the shape of the work.

References Cited by the Examiner

UNITED STATES PATENTS

| | | | |
|---|---|---|---|
| 804,109 | 11/1905 | Evans | 83—384 |
| 980,241 | 1/1911 | Gardner et al. | 269—258 |
| 1,330,186 | 2/1920 | Hayes | 83—384 |
| 1,372,221 | 3/1921 | Dutro et al. | 83—384 |
| 1,385,369 | 7/1921 | Ferrier | 83—157 |
| 1,646,447 | 10/1927 | Dinzl | 83—282 |
| 1,690,503 | 11/1928 | Rhodes | 83—391 |
| 1,712,723 | 5/1929 | Zuber | 83—387 |
| 2,219,682 | 10/1940 | Doble | 83—157 |
| 2,365,663 | 12/1944 | Torrese | 83—391 |
| 2,432,804 | 12/1947 | Rieske | 83—375 X |
| 2,603,291 | 7/1952 | Williams | 83—157 |
| 2,655,192 | 10/1953 | LaLone | 83—387 |
| 2,667,922 | 2/1954 | Hill et al. | 83—642 |
| 2,973,678 | 3/1961 | Scott et al. | 83—157 |
| 3,054,316 | 9/1962 | Pearson | 83—390 |
| 3,054,317 | 9/1962 | Castle | 83—390 X |

FOREIGN PATENTS 229,430   7/1960   Australia.

WILLIAM W. DYER, JR., *Primary Examiner.*
LEON PEAR, ANDREW R. JUHASZ, *Examiners.*